United States Patent Office 2,903,780
Patented Sept. 15, 1959

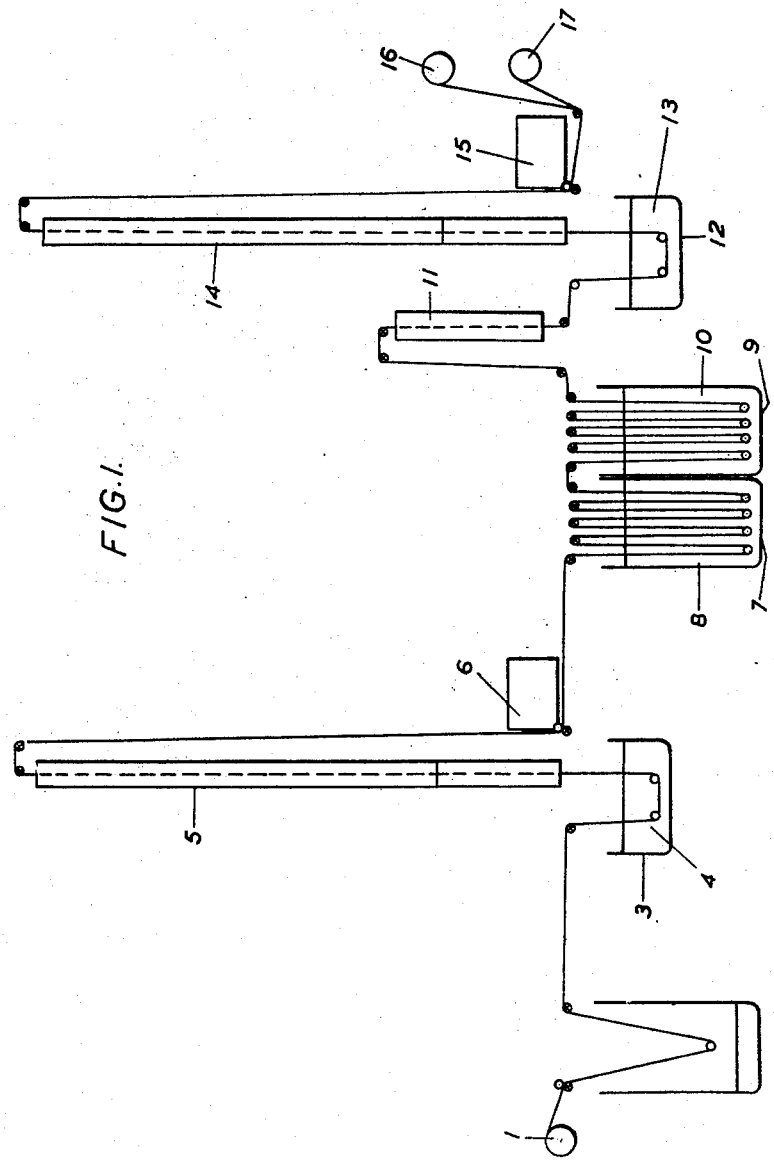

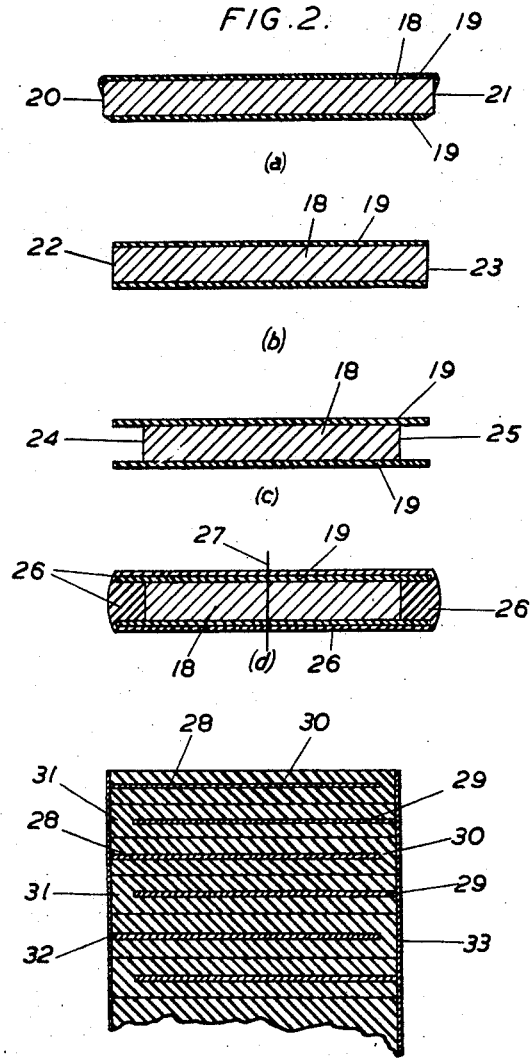

---

2,903,780

MANUFACTURE OF ELECTRICAL CAPACITORS

Roy Mayne Barnard, Douglas Stacey Girling, and Nigel Cecil William Judd, London, England, assignors to International Standard Electric Corporation, New York, N.Y.

Application August 17, 1953, Serial No. 374,756

Claims priority, application Great Britain August 19, 1952

5 Claims. (Cl. 29—25.42)

This invention relates to the manufacture of electrical capacitors, comprising an electrode coated with an insulating material. In the process of coating a conductor with an insulating material it is found that there is a tendency for small spots on the conductor to remain uncoated, and also, due to surface tension, for the insulating film to retract from the edges of the conductor. These weak spots in the insulation are rendered less liable to cause breakdown by the known process of dissolving any of the uncoated portions of the conductor.

However, with this arrangement the edges of the foil, which are the points of the highest electrical stress in the completed capacitor, are completely uninsulated, and it is therefore necessary to allow a comparatively large flash over gap, between the edges of the electrodes of the capacitor.

The present invention is concerned with a development of this process in which after the uncoated portions of the conductor have been dissolved a further coating of an insulating material is given so that all the gaps are sealed, including those at the edges. The coated conductor is then cut along its length with the result that two conductors are produced, each completely coated with insulating material except along the one edge at which the cut has been made. The conductors may then be made up into a capacitor with the uncoated edge of each conductor on opposite sides of the unit and electrical connections made to the uncoated edges.

It is thus possible to produce a capacitor having one edge of each electrode completely protected by a material of good dielectric strength so that the flash over gap may be smaller than previously.

This also facilitates the electrical connection to the electrodes and enables a more compact capacitor to be manufactured.

In accordance with the invention the manufacture of an electrical capacitor comprises the steps of applying a coating of an insulating material to a conductor, dissolving any portions of the conductor not coated by the insulating material, coating with a further layer of an insulating material, and cutting the double coated conductor into two parts along its length, so that each of the lengths thus formed has an uncoated edge to which connection may be made when the foil is used as an electrode in a capacitor.

Embodiments of the invention will now be described with reference to the accompanying drawing in which:

Fig. 1 represents an arrangement for manufacturing a coated foil,

Fig. 2 shows sections through a foil at various stages during the process shown in Fig. 1, and Fig. 3 shows a section through part of a capacitor unit using foil made by the process of Fig. 1.

Referring to Fig. 1 the uncoated conductor in the form of a foil is fed from a spool 1 through a vapour degreaser 2, a bath 3 containing an insulating material 4, such as one of the polyarylepoxyethene resins, known under the registered trademark of Araldite, in liquid form which may be a solution, and then into a drying unit 5 where any solvent may be evaporated and, if necessary (as in the case of the resin mentioned above), the coating cured. The edges of the coated foil are then trimmed by the tool 6 so that any coating on the edges is removed and the edges of the foil between the insulating material are left exposed.

This coated foil is then passed through a bath 7 containing a liquid 8 which will dissolve the foil. In the case of aluminium foil the liquid 8 may be a solution of sodium hydroxide. The duration of immersion in the liquid 8 is so arranged that any portion of the foil faces not coated by the insulating material will be dissolved and so that a small portion of the exposed foil at the edges will be dissolved.

The liquid 8 is such that it will not affect the insulating material and therefore a coated foil having channelled edges is produced.

This coated foil is then passed through a bath 9 containing distilled water 10 and is washed before passing through a drying unit 11 and a tank 12 containing a suitable insulating material 13 in liquid form. The coated foil is thus given a second coating which causes it to be completely covered, the capillary action caused by the channelled edges ensuring a complete coverage of the edges.

The insulating material 13 may be the same as material 4 used for the first coating, but it must be a material which although it wets and forms a bond with the original coating will not dissolve the original coating.

The doubly coated foil is now passed through a further drying unit 14 where the second coating is dried and if necessary cured, before being passed to a cutting machine where it is cut in two along its length and the two portions wound on two separate spools 16 and 17.

On each of these spools there is thus wound a metal foil completely coated with insulating material except along one edge.

These foils may then be made the electrodes of a capacitor by laying two of them together and making electrical connections to the respective uncoated edges. Alternatively one of the coated foils may be laid together with an uncoated foil to form the electrodes of a capacitor.

The connections to the foils may easily be made by coating the edges of a capacitor so formed with a conducting material since it is easy to arrange for the uncoated edge of one electrode to appear at one side of the capacitor and for the edge of the other electrode to appear at the other side of the capacitor. For example the connections may be made by spraying the sides of the capacitor with a conducting material, and making the external connections to the sprayed sides. Contact is thus obtained over the entire length of the exposed edge resulting in the minimum electrical resistance and a low inductance.

Referring to Fig. 2 there are shown sections through a foil 18 at various stages during the process shown in Fig. 1. At (a) the foil 18 has been coated with a layer of insulating material 19 which has not covered evenly the foil edges 20 and 21. At (b) these edges 20 and 21 have been trimmed by the tool 6 in Fig. 1 to completely disclose the edges 22 and 23 of the foil. The foil of (c) has been passed through a solution which dissolves the edges 22 and 23 of the foil 18 while leaving the insulating material 19 untouched. A further coating of insulating material 26 is then applied to the foil, as shown at (d), and, owing to the capillary action of the channelled edges 24 and 25, the edges are now completely coated. The foil is then slit into two parts along the line 27 by the tool 15 in Fig. 1 and two similar foils are produced completely coated with insulating material except along the edge where the slit has been made.

In Fig. 3 a section is shown through two similar foils 28 and 29 coated by insulating material 30 and 31 and made by the above process and rolled together so that the uncoated edge of each foil appears on the opposite edge of the roll. Connections are then made to the foils by spraying the edges of the roll with layers of metal 32 and 33. A capacitor thus produced may be impregnated and sealed with a suitable insulating material.

In some cases it is advisable to use radio frequency heating in the first part at least of each drying unit, 5 or 14, so that the solvent is driven off first from the interior of the coating.

Infra-red heating, may then be used in the later parts of the units 5 and 14 to complete the curing. Hot air drying may also be used in some parts of the process, for example, after the vapour degreasing bath 2.

The process need not be continuous but may take place in stages, and more than two coating stages may be used if required. The thickness of the coating may also be varied by other means, such as the viscosity of the coating material. The depth to which the foil is eaten away may also be varied by the strength and temperature of the solution 8 and the speed at which the foil is passed through the solution.

While the principles of the invention have been described above in connection with specific embodiments, and particular modifications thereof, it is to be clearly understood that this description is made only by way of example and not as a limitation on the scope of the invention.

What we claim is:

1. A method of manufacturing electrical capacitors, comprising the steps of applying a first coating of insulating material to a flat conductor to form an adherent insulating cover thereon, dissolving any exposed portions of the conductor which are not completely covered by said first coating, applying a second coating of insulating material over the first coating and thereby covering the areas of said conductor where the portions thereof have been dissolved, cutting the conductor and its two adherent coatings into two sections extending along the length thereof so that the only part of the conductor in each section which is exposed is at the cut edge, the entire remainder of the conductor in each section being completely and adherently surface insulated by said two coatings, and superposing said two sections to form a stack and with the said exposed edges located on opposite sides of the stack, whereby the said uncoated edges on each side of the stack can be connected to a corresponding conductor.

2. A method according to claim 1 in which all the exposed edges of said conductors on the same side of the stack are provided with a continuous metallized coating to provide a common electrical connection thereto.

3. A method according to claim 1 in which the said doubly coated conductor is subjected to said cutting operation prior to said dissolving step, whereby the exposed edges of the said conductor are recessed with respect to the coatings as a result of the dissolving step.

4. A method according to claim 1 in which each of said coatings is applied as a solution of an insulating material and each coating is dried to drive off the solvent.

5. A method according to claim 4 in which the application of at least one of said coatings includes the step of polymerizing or curing the said coating in addition to the said drying thereof.

References Cited in the file of this patent

UNITED STATES PATENTS

| 2,274,011 | Strab | Feb. 24, 1942 |
| 2,399,798 | Grouse et al. | May 7, 1946 |
| 2,520,173 | Sanders | Aug. 29, 1950 |
| 2,607,825 | Eisler | Aug. 19, 1952 |
| 2,802,256 | Dauner et al. | Aug. 13, 1957 |